A. H. KINDER.
SPARE TIRE CASE.
APPLICATION FILED JAN. 21, 1909.
926,499.
Patented June 29, 1909.
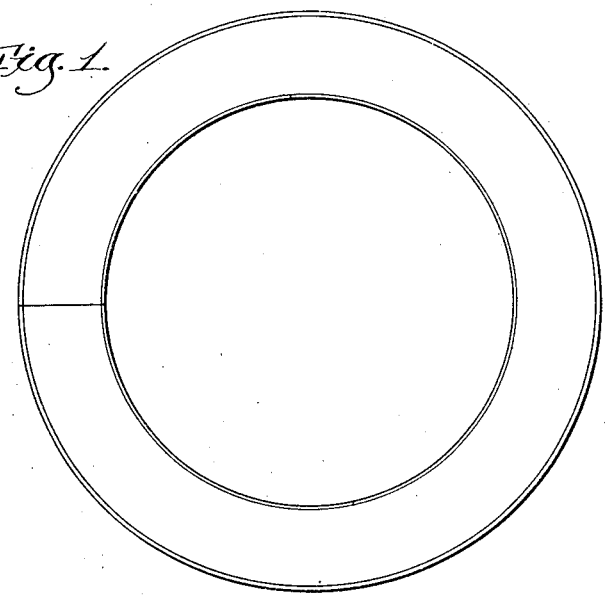
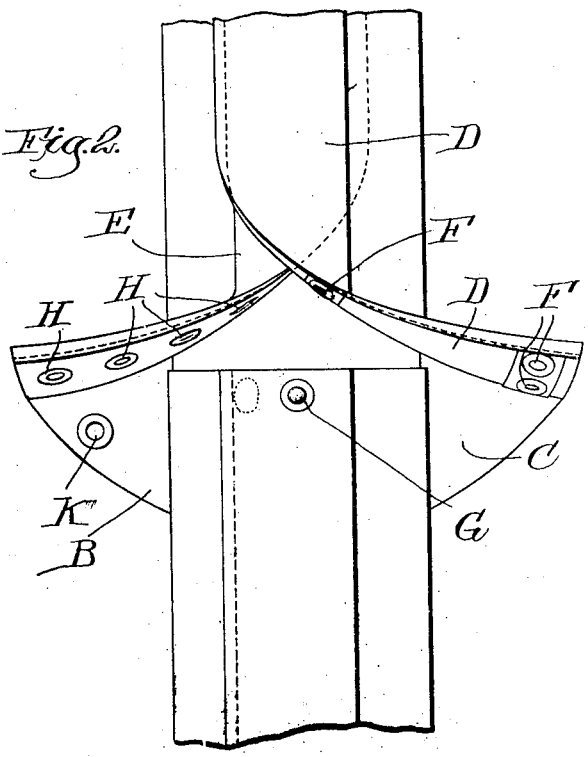
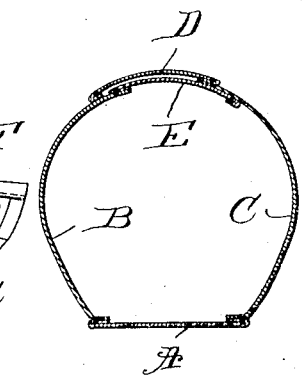
Witnesses.
Thomas J. Drummond
Joseph M. Ward.
Inventor.
Arthur H. Kinder,
by Crosby & Gregory
att'ys.

UNITED STATES PATENT OFFICE.

ARTHUR H. KINDER, OF BOSTON, MASSACHUSETTS, ASSIGNOR TO CHARLES F. HOPEWELL AND FRANK B. HOPEWELL, OF CAMBRIDGE, MASSACHUSETTS, A FIRM.

SPARE-TIRE CASE.

No. 926,499.　　　　　Specification of Letters Patent.　　　Patented June 29, 1909.

Application filed January 21, 1909. Serial No. 473,574.

*To all whom it may concern:*

Be it known that I, ARTHUR H. KINDER, a citizen of the United States, and a resident of Boston, in the county of Suffolk and State of Massachusetts, have invented an Improvement in Spare-Tire Cases, of which the following description, in connection with the accompanying drawing, is a specification, like letters on the drawing representing like parts.

This invention has for its object the production of a novel form of tire case for enveloping and protecting a spare tire such as used on automobiles.

The particular object is to provide such a case which shall at its line of closure fit snugly against and cling to the tire so as to prevent as far as possible the entrance of moisture and dust.

The object is also to provide a case which will be adjustable to tires of varying diameter and varying size.

Hitherto in the construction of these tire cases the tire case has been commonly formed (1) of a bead strip fitting the bead or base of the tire and cut with straight parallel edges; (2) of two flange strips covering the swelling side portions of the tire and cut with concentric circular edges; and (3) a tread strip covering the tread portion of the tire and like the bead strip cut with straight parallel edges.

In the present invention I have discovered that by forming the tread strip of a circular form that a much better fit can be obtained and fewer fastening devices need be employed.

The main feature of this invention resides, therefore, in providing a circular strip, or a strip having substantially concentric circular edges for the tread portion of the tire. When the tire is thus constructed the free edge of the tread strip binds closely against the tire preventing the admission of water and dust and holding the tire firmly in place without any substantial wrinkling. It enables the tire to be readily placed in position and in practice I have found three fastening devices, such as snap buttons, located at the peripheral edge of the tire case amply sufficient to hold the tire case in position, one being located at one end and two at the other end.

An additional feature of the invention resides in providing the overlapping edges of the case with a plurality of concealed fastening devices enabling the tire case to be adjusted in cross-section to provide for the varying cross-section of tires of the general size due to different styles of manufacture.

The nature of the invention will more fully appear from the accompanying description and drawings and will be particularly pointed out in the claims.

The drawings illustrate the preferred embodiments of the invention.

In the drawings, Figure 1 is a side elevation of the tire case in position. Fig. 2 is a top plan view of the telescoping ends of the tire case with the overlying ends turned back to show the construction. Fig. 3 is a cross-section of the tire case in the form it assumes when in position.

The tire case is shown as arranged for the usual form of tire having a horseshoe-shape in cross-section.

The tire case comprises essentially a bead strip A covering the bead or base of the tire, flange strips B, C united thereto and covering the sides of the tire, and a tread strip E covering the tire tread.

The inner surface or bead of the tire being practically cylindrical, the bead strip A is a straight strip of material having parallel edges. The sides of the tire being circular the flange strips B and C are cut from material in a circular form. The lower edges of these strips being attached to the edges of the bead strip A are cut on circles whose radii are equal to the radius of the inner surface or bead of the tire. The length of the radius of the outer edge of these strips should be substantially equal to the radius of the center line of the tread of the tire, so as to prevent liability of wrinkling.

The space at the tread portion of the tire or the space lying between the edges of the side strips B and C is protected by the tread strip E, of a single piece and having its edges substantially circular. The essential feature of the invention is that the tread strip shall substantially cover the tread portion of the tire and that its outer or free edge shall be formed on a circle having a radius less than the radius of the outer edge of the side strip to which it is connected, and that its free edge shall overlap the opposite side of the tire case. The reason for this and the result secured will be apparent. One edge of the tread strip E, for example, must be united to the edge of the flange strip B, and must consequently be of equal length to the said edge. The free circular edge of the tread strip must therefore be formed on a radius less than the radius of the outer edge of the flange strip B, and hence the free circular edge of the tread strip E will be formed on a radius less than the radius of the outer edge of the strip B by a distance substantially equal to the width of the tread strip. The free edge of the tread strip E will therefore be cut on a smaller circle than the circular line on the side of the tire against which it will rest, and consequently it will cling firmly to and fit snugly against the tire. I find in practice that the fit is so snug and firm at this point that there is little danger of dust or moisture passing into the tire case at the edge, and the edge is located well beneath the bulging sides of the tire so that rain will not drive into the case. The manner in which the tire case clings to the tire when thus constructed requires the use of but few fastening devices and I have found in practice that three snap buttons were amply sufficient, thus enabling the tire case to be very readily placed in, and removed from, position on the tire.

An overlapping strip D attached to the edge of the flange strip C and overlapping the tread strip E is preferably constructed in a similar manner to the tread strip E, although it may be made in more than one piece and comprise a narrow straight strip at its edge adjacent to the flange strip C provided, however, that it still remains a substantially circular piece as contradistinguished from a straight-edged strip.

In cutting the tire case due allowance must be made for the seams which are to unite the edges of the strips. The overlying strip D, will naturally be cut of such a width as to bring its edge well back from the swell of the tire at the sides so that rain or water will not drive into or drip into this edge at the bottom of the tire case when supported in a vertical position.

The tire case instead of being formed in a complete ring is separated at its ends, and these ends are arranged to telescope, as indicated in Fig. 2. These telescoping ends are provided with a series of suitable fasteners, herein shown as snap buttons. A single stud member, G, for example, being placed upon the outside of the strip D and a corresponding row of socket members H being placed upon the inside of the tread strip E at its other end so that when the ends telescope by engaging different socket members with the said stud member the circumferential length of the tire case may be varied to fit tires of varying diameter.

The overlying strip is provided at suitable intervals and on the underside with a plurality of suitable fastener members, such as the socket members F of snap buttons, which are concealed from view, and which coöperate with a single complemental member, such as the stud member K, of a snap button, on the outer side of the underlying strip, so that the tire case is adjustable to enlarge or contract its cross-section to fit tires of varying cross-section, and the fastening members are at all times concealed from view. I find that in practice it is sufficient to place one fastener on the end of the case which is first fastened around the tire and two fasteners on the end which telescopes over the said end. The fasteners on the overlying end are preferably placed one at the end and one a short distance back from the end and serve to hold the tire firmly without wrinkling whatever the circumferential adjustment by means of the fasteners G, H may be.

Having described my invention, what I claim as new and desire to secure by Letters Patent, is:

1. A spare tire case comprising a straight edged bead strip, concentric circular edged flange strips united to said bead strip, a tread strip having substantially circular concentric edges and directly connected to one of said flange strips and having its free circular edge formed on a radius less than the radius of the outer edge of said flange strip.

2. A spare tire case comprising a straight edged bead strip, concentric circular edged flange strips united to said bead strip, a tread strip having substantially circular concentric edges and directly connected to one of said flange strips and of a width sufficient to extend over the tire tread and overlap the other flange strip and having its free circular edge formed on a radius less than the radius of the outer edge of said flange strip.

3. A spare tire case comprising a straight edged bead strip, concentric circular edged flange strips united to said bead strip, a tread strip having substantially circular concentric edges and directly connected to one of said flange strips and of a width sufficient to extend over the tire tread and having its free circular edge formed on a radius less than the radius of the outer edge of said flange strip by a distance equal to the distance from the edge of said flange strip to said free circular edge.

4. A spare tire case formed of strips of material and adapted to fit over an annular tire, the said tire case presenting free annular overlapping edges and telescoping ends, a plurality of transversely arranged fastener members mounted at intervals upon the underside of the overlying edges, and a complemental fastener member mounted at corresponding intervals on the outer side of the underlying material, whereby the tire case may be adjusted in cross-section and the fasteners remain concealed.

5. A spare tire case comprising a straight edged bead strip, concentric circular edged flange strips united to said bead strip, a tread strip having substantially circular concentric edges and directly connected to one of said flange strips and of a width sufficient to extend over the tire tread, and an overlapping strip connected to the other of said flange strips and having a free circular edge formed on a radius less than the radius of the outer edge of its connected flange strip.

6. A spare tire case comprising a straight edged bead strip, concentric circular edged flange strips united to said bead strip, overlapping tread strips one connected to one and the other to the other of said flange strips and each of a width sufficient to extend over the tire tread and each having its free circular edge formed on a radius less than the radius of the outer edge of its connected flange strip by a distance equal to the distance from the edge of its connected flange strip to said circular edge.

In testimony whereof, I have signed my name to this specification, in the presence of two subscribing witnesses.

ARTHUR H. KINDER.

Witnesses:
THOMAS J. DRUMMOND,
MABEL PARTELOW.